United States Patent

[11] 3,615,183

[72] Inventor Wilbur Don Wise
 Benton, Ark.
[21] Appl. No. 9,037
[22] Filed Feb. 5, 1970
[45] Patented Oct. 26, 1971
[73] Assignee Reynolds Metals Company
 Richmond, Va.

[54] REMOVAL OF CHROMIUM FROM ALUMINUM NITRATE
 5 Claims, No Drawings
[52] U.S. Cl. ........................................ 23/102 R, 23/145
[51] Int. Cl. ........................................ C01f 7/24, C01f 7/66
[50] Field of Search ........................................ 23/102, 25, 145; 75/108, 109, 121

[56] References Cited
UNITED STATES PATENTS

| | | | |
|---|---|---|---|
| 3,383,166 | 5/1968 | Gerry et al. ................ | 23/102 |
| 3,399,958 | 9/1968 | Brown ........................ | 23/52 |
| 3,440,005 | 4/1969 | Featherston et al. ........ | 23/52 |

Primary Examiner—Oscar R. Vertiz
Assistant Examiner—G. O. Peters
Attorney—Glenn, Palmer, Lyne, Gibbs & Thompson

ABSTRACT: Aluminum nitrate solutions contaminated with dissolved chromium, and particularly those obtained in the extraction of clay or bauxite with nitric acid, are substantially freed from chromium by treatment with an alkali persulfate in the presence of hematitic iron oxide solids.

REMOVAL OF CHROMIUM FROM ALUMINUM NITRATE

BACKGROUND OF THE INVENTION

The present invention relates to a novel method for the removal of chromium from solutions of aluminum nitrate. Aluminum nitrate is an industrially important chemical which is marketed mainly in the form of its nonahydrate, Al(NO$_3$)$_3$·9H$_2$O, as white crystals, soluble in cold water. It is used in textile treatment and leather tanning, and has been proposed as a source of alumina. The aluminum nitrate may be produced by the action of strong nitric acid on aluminum metal, for example, scrap aluminum or aluminum alloys. In the treatment of aluminum alloys, chromium may be dissolved and constitute a contaminant in the aluminum nitrate.

Aluminum nitrate may also be produced by treatment of aluminous ores, including clays and bauxite, with nitric acid, in which case the aluminum nitrate is processed further to decompose the material into alumina, with recovery of the nitric acid. Some Caribbean bauxites, and particularly the Jamaican bauxites, are relatively high in chromium content, and this is picked up by the nitric acid, appearing as an impurity in the resulting aluminum nitrate solution, when such ores are digested with strong nitric acid.

Purity specifications for alumina, and particularly alumina of ceramic grade, limit the chromium oxide (Cr$_2$O$_3$) content to 10 parts per million or less. Concentrations of chromium in excess of this limit impart an unacceptable pink color to the fused ceramic product made from the alumina. Iron contamination is similarly undesirable in the finished alumina, and may be present where bauxite or clay is extracted with nitric acid, and may appear not only in the aluminum nitrate first obtained, but also later on in the alumina made by decomposition of the aluminum nitrate, in an amount exceeding specification limits. Thus, for metallurgical grade alumina, to be used for reduction electrolytically to aluminum metal, the iron content, reported as Fe$_2$O$_3$, should not exceed 0.02 percent by weight.

Thus, in order to obtain ultimately an alumina which meets the specification limits as to chromium and iron content, the aluminum nitrate from which the alumina is to be produced should have its iron (Fe$_2$O$_3$) content reduced to not more than 0.035 percent by weight, and its chromium (Cr$_2$O$_3$) content reduced to not more than about 0.0002–0.0004 percent (alumina basis).

Various methods have been proposed in the literature for reducing the Cr$_2$O$_3$ content of aluminum nitrate solutions, at various concentrations, including, for example, sequestration, complexing, and liquid—liquid solvent extraction, but these generally involve the use of reagents having a cost too high to be considered feasible on an industrial scale, and also require special equipment and facilities.

Where iron is present in unacceptable amounts in the aluminum nitrate solution, the removal of chromium must be considered in conjunction with a prior removal of at least part of the iron in order to arrive at a feasible commercial process.

GENERAL DESCRIPTION OF THE INVENTION

The method of the present invention will be illustrated with regard to the removal of chromium in conjunction with the removal of iron, from an aluminum nitrate solution containing these impurities, particularly an aluminum nitrate solution obtained by extraction of an aluminous ore, such as chromium containing bauxite or clay, with nitric acid. However, it is to be understood that the method of the invention is of general applicability to aluminum nitrate solutions containing chromium and iron impurities, from whatever source derived, and this illustration is not to be regarded as limiting.

Extraction of alumina from calcined clay or bauxite by means of nitric acid of a concentration between about 35 percent and about 70 percent HNO$_3$ is known in the prior art; and it is also known that the use of less than stoichiometric quantities of nitric acid achieves at least a limited amount of "basicity" of the resulting aluminum nitrate solution by the ability of the solution to dissolve excess alumina. Aluminum nitrate solutions obtained by batch extraction, for example by boiling at atmospheric pressure, may contain up to about 1 percent to 2 percent Fe$_2$O$_3$ and up to about 0.2 percent Cr$_2$O$_3$ (both on alumina basis), while solutions obtained by countercurrent extraction may contain from about 5 percent to 7 percent of Fe$_2$O$_3$ and about 0.2 percent Cr$_2$O$_3$, calculated as a weight percent of the alumina present. Such solutions produce alumina containing iron and chromium values too high to meet specifications. The solutions are also supersaturated with respect to the iron, and by reason of their basicity exhibit a tendency toward auto-precipitation of iron oxide hydrate in a gelatinous form, which if uncontrolled, will interfere with subsequent iron removal so as to prevent attainment of the desired low iron content of the final alumina product.

A process has been proposed previously by others for the removal of iron from an iron-contaminated aqueous solution of aluminum nitrate, wherein a basic solution of aluminum nitrate is heated in a first stage in the presence of seed to cause a major portion of the iron present to precipitate as a predominantly hematitic iron oxide, the precipitated iron oxide is separated, and the iron removal is completed in a second stage by treating the partly deironed solution by the addition of iron oxide which may be obtained either by thermal decomposition of ferric nitrate or by recycling of hematitic iron oxide precipitated in the second stage, or both. In carrying out the process of the present invention, the chromium content of the original aluminum nitrate solution may be removed in either the first or second stage.

The above-mentioned iron removal process involves maintaining the original iron (and chromium) contaminated aluminum nitrate solution at a temperature between about 105° and about 120° C. for a period of time sufficient to cause precipitation of the major portion of the iron as predominantly hematitic iron oxide. This time period may range from about 30 minutes to about 5 hours. Thereby about 80 percent to 90 percent of the iron present precipitates as hematitic iron oxide, in a crystalline and nongelatinous form. This iron oxide is separated and utilized as recycle material to maintain a substantially constant solids content in the first iron removal stage.

A typical aluminum nitrate solution obtained by nitric acid extraction of aluminous ores will contain up to about 7 percent Fe$_2$O$_3$ (on the basis of the alumina present in the solution), usually between about 4 percent and 5 percent Fe$_2$O$_3$. It will also contain about 35 percent to 40 percent of nitrate ion and about 10 percent to 11 percent total alumina, all percentages being by weight. This would correspond to about 5 percent to 10 percent alumina in excess of the stoichiometric amount, and hence the solution will be basic. The Cr$_2$O$_3$ content may be about 0.2 percent by weight. An aluminum nitrate solution having these characteristics will illustrate the starting material for first stage iron removal, but is not to be regarded as limiting. Should the dissolved iron be sufficiently low, less than 0.5 percent Fe$_2$O$_3$ (Al$_2$O$_3$ basis), the first stage iron removal may be dispensed with.

Where the partly deironed solution resulting from first stage iron removal is to be employed, or where the aluminum nitrate solution is sufficiently low in iron content to dispense with first state treatment, the treatment thereof involves heating at about 105°–120° C. and at atmospheric pressure, and this will result in a further precipitation of hematitic iron oxide material which is recovered and reused.

In both of these iron removal stages, however, little or no removal of the chromium content is achieved.

Accordingly, it is an object of the present invention to provide a method of treating aluminum nitrate solutions contaminated with dissolved chromium, and particularly aluminum nitrate solutions obtained in the course of processing bauxite or clay by extraction thereof with nitric acid, and with the ultimate purpose of producing high grade alumina.

It was found, in accordance with the present invention, that substantially all the chromium present can be removed by treatment of the contaminated aluminum nitrate solution, in the presence of hematitic iron oxide seed, with an alkali persulfate, such as ammonium persulfate. Surprisingly, it was found that neither the iron oxide nor the persulfate will remove chromium effectively when used alone, although a small amount may be thus taken out of solution. However, the latter amount is not significant when compared to the high degree of removal achieved when employing the iron oxide seed and the persulfate together.

The iron oxide seed also may be obtained by the thermal decomposition of ferric nitrate at a temperature of about 350° to 400° C., in accordance with known methods. This material, which is hematitic in character, is capable per se of precipitating dissolved iron from aluminum nitrate solutions.

The alkali persulfate used may be ammonium, sodium or potassium persulfate, but the ammonium salt is preferred in order to avoid introduction of additional alkali metal. The amount employed will generally range between about 2.5 percent and about 10 percent by weight of the alumina ($Al_2O_3$) present in the solution. This amount is not critical, however, but will be gauged in accordance with the $Cr_2O_3$ present in the aluminum nitrate liquor. It is advantageously used as an aqueous solution.

The amount of iron oxide seed employed in conjunction with the persulfate will generally range from a small but effective amount up to about 20 parts per 100 parts of aluminum nitrate liquor, by weight, preferably about 1 to 5 parts per 100.

The treatment is performed by heating the iron oxide seed-containing aluminum nitrate solution, to which the persulfate has been added, at a temperature between about 105° and about 120° C., preferably about 118° C., at atmospheric pressure, for a period of time between about 30 minutes and about 5 hours.

DESCRIPTION OF THE PREFERRED EMBODIMENTS

As mentioned previously, the starting aluminum nitrate solution which is contaminated with dissolved iron and chromium may be obtained from a variety of sources, including alloy scrap. It may also be obtained from the leaching or digestion of aluminous ores (including clay) having a substantial iron and/or chromium content, by either batch or countercurrent extraction methods. In such extraction of aluminous ores, the ore may be pelletized and treated with nitric acid having a concentration between about 30 percent and 70 percent $HNO_3$ in accordance with conventional prior art procedures. A typical extract obtained in this manner will contain up to about 7 percent $Fe_2O_3$ (on the basis of the alumina present in the solution), typically between 4 and 5 percent $Fe_2O_3$. This solution is first treated by heating at or near its boiling temperature (about 105° to 120° C.) for about 3 to 4 hours, to cause a major portion of the iron content of the solution to precipitate as a predominantly hematitic iron oxide. After separation of the iron oxide, the resulting aluminum nitrate solution contains about 0.2 to about 0.4 percent $Fe_2O_3$ (alumina basis), representing removal of about 80 to 90 percent of the iron originally present. This partly deironed aluminum nitrate solution may serve as the starting material for the process of the present invention. An aluminum nitrate solution derived from other sources, such as alloy scrap, but having a similar iron and chromium content, may also serve as a starting material.

The following examples illustrate the practice and advantages of the process of the invention, but are not to be regarded as limiting:

EXAMPLE 1

Removal of Chromium Contamination

Fifty grams of aluminum nitrate liquor containing 10.90 percent $Al_2O_3$, 38.87 percent $HNO_3$, 0.54 percent $Fe_2O_3$, and 0.0019 percent $Cr_2O_3$ were weighed into a 300 ml. Erlenmeyer flask. This sample was then charged with iron oxide seed (2.5 grams, or 5 percent by weight) prepared by thermal decomposition of ferric nitrate at 400° C., and 2.5 ml. of a 1 percent solution of $(NH_4)_2S_2O_8$ (about 10 pounds/ton $Al_2O_3$ charge). The seed had a surface area of about 63 square meters per gram and an L.O.I. of about 3.6 percent. The sample was then boiled under reflux at about 118° C. for 4 hours on a mag-mixer hot plate using a 1 inch Teflon-coated magnet. The sample was then filtered through a 60° funnel using S&S 589 blue ribbon filter paper until a clear solution was obtained. The filtrate was then analyzed and was found to contain 10.11 percent $Al_2O_3$, 0.0032 percent $Fe_2O_3$, and 0.00013 percent $Cr_2O_3$.

EXAMPLE 2

Removal of Chromium Contamination

Fifty grams of aluminum nitrate liquor containing 10.35 percent $Al_2O_3$, 36.02 percent $HNO_3$, 0.019 percent $Fe_2O_3$, and 0.0010 percent $Cr_2O_3$ were weighed into a 300 ml. Erlenmeyer flask. This sample was then charged with 5 ml. 1 percent $(NH_4)_2S_2O_8$ (about 20 pounds/ton $Al_2O_3$) and 5 percent by weight of iron oxide seed prepared by heating aluminum nitrate digestion liquor at 105°–120° C. to generate autoprecipitated hematitic material of a coarse, deep red granular nature, then separating and activating that material at 650° F. for about 50 minutes, to obtain a seed of about 32 sq. meters per gram and 9.9 percent L.O.I. The sample was then boiled under reflux at about 118° C. for 1 hour on a Mag-mixer hot plate using a 1 inch Teflon-coated magnet. The sample was then filtered through a 60° funnel using S&S 589 blue ribbon filter paper until the filtrate was clear. The filtrate was then analyzed and was found to contain 9.68 percent $Al_2O_3$, 0.0043 percent $Fe_2O_3$, and 0.00010 percent $Cr_2O_3$. A second sample was treated as above with seed prepared from the thermal decomposition of ferric nitrate, and was charged at 1 percent by weight of liquor. The filtrate contained 9.60 percent $Al_2O_3$, 0.00013 percent $Cr_2O_3$, and 0.0095 percent $Fe_2O_3$.

EXAMPLE 3

Effect of Temperature on Chromium Removal

Fifty grams aluminum nitrate solution containing 11.28 percent $Al_2O_3$, 38.71 percent $HNO_3$, 0.0141 percent $Fe_2O_3$, and 0.00105 percent $Cr_2O_3$ were weighed into a 300 ml. Erlenmeyer flask and charged with 2.5 ml. $(NH_4)_2S_2O_8$ (about 10 pounds/ton $Al_2O_3$ charge) and 5 percent (by weight of liquor) ferric nitrate derived iron oxide seed, having a surface area of about 57 square meters per gram and an L.O.I. of 3.7 percent, produced by heating ferric nitrate for 16 hours at 105° C. and 15 minutes at 650° F. The sample was then digested one hour at about 118° C. under reflux while stirring with a 1 inch Teflon-coated magnet on the Mag-mixer hot plate. The sample was then filtered through a 60° funnel using S&S 589 blue ribbon filter paper. The clear filtrate was then analyzed. For the sample at 80° C. and 150° C. the samples were charged in the same manner and placed in a constant temperature oven and rotated at 24 r.p.m. for 1 hour after reaching the desired temperature. The samples were then handled in the same manner as above.

| Samples | Temperature, ° C. | Percent Percent— | | | |
|---|---|---|---|---|---|
| | | $Al_2O_3$ | $Fe_2O_3$ | $Cr_2O_3$ | $HNO_3$ |
| Starting liquor | | 11.28 | 0.0141 | 0.00105 | 38.71 |
| 1 | 80 | 10.82 | 0.0052 | 0.00061 | |
| 2 | 118 | 10.11 | 0.0024 | 0.00022 | |
| 3 | 150 | 10.73 | 0.0015 | 0.00012 | |

The treatment at 150° C. gave the greatest degree of chromium removal.

EXAMPLE 4

Effect of Treatment Time

Fifty grams aluminum nitrate liquor containing 10.35 percent $Al_2O_3$, 36.02 percent $HNO_3$, 0.020 percent $Fe_2O_3$, and 0.0018 percent $Cr_2O_3$ were charged with 2.5 ml. 1 percent $(NH_4)_2S_2O_8$ solution (about 10 pounds/ton $Al_2O_3$ charge) and 5 percent (by weight of liquor) iron oxide seed prepared from ferric nitrate, having a surface area of about 66 square meters per gram and an L.O.I. of 3.9 percent, produced by heating ferric nitrate for 16 hours at 105° C. and 650° F. for 10 minutes. Samples were digested in a 300 ml. Erlenmeyer flask at atmospheric boiling at about 118° C. for 4, 2, 1, ½ hours on a Mag-mixer hot plate. After digestion, the samples were filtered through a S&S 589 blue ribbon filter paper until a clear filtrate was obtained. The filtrate was then subjected to analysis.

| Sample | Time | Percent— | | | |
|---|---|---|---|---|---|
| | | $Al_2O_3$ | $HNO_3$ | $Fe_2O_3$ | $Cr_2O_3$ |
| Starting liquor | | 10.35 | 36.02 | 0.020 | 0.0018 |
| 1 | 4 | 10.84 | | 0.0014 | 0.0002 |
| 2 | 2 | 10.89 | | | 0.0002 |
| 3 | 1 | 10.41 | | | 0.0001 |
| 4 | ½ | 10.23 | | | 0.0001 |

A treatment time of ½ to 1 hour gave the greatest degree of chromium removal.

The effect of the amount of persulfate employed on the degree of chromium removal is illustrated by the following table:

TABLE 1

[Effect of $(NH_4)_2S_2O_8$ charge rate on $Cr_2O_3$ removal]

| Charge $(NH_4)_2S_2O_8$ #/ton $Al_2O_3$ | Percent, $Al_2O_3$ | Chromium ($Cr_2O_3$) | |
|---|---|---|---|
| | | Liquor | $Al_2O_3$ basis |
| 20 | 9.83 | 0.0002 | 0.00203 |
| 10 | 9.60 | 0.0002 | 0.00208 |
| 8 | 10.56 | 0.0004 | 0.00379 |
| 5 | 9.67 | 0.0005 | 0.00517 |
| 4 | 11.34 | 0.0009 | 0.00794 |
| 1 | 10.18 | 0.0014 | 0.01375 |
| 0 | 10.35 | 0.0015 | 0.01449 |

Five percent seed prepared as described above was added and ranging amounts of ammonium persulfate. The sample was then digested 1 hour on the Mag-mixer hot plate at about 118° C. while being agitated with a 2 inch bar. Maximum chromium removal was achieved with an addition of 1 percent ammonium persulfate based on the weight of alumina present.

The effect of the amount of iron oxide seed employed on the degree of chromium removal is illustrated in table 2:

TABLE 2

[Effect of charge of iron oxide seed, prepared as previously described, on $Cr_2O_3$ in aluminum nitrate liquor]

| Percent iron oxide seed by weight | Percent | | Chromium ($Cr_2O_3$) | |
|---|---|---|---|---|
| | $Al_2O_3$ | $Fe_2O_3$ | Liquor | $Al_2O_3$ basis |
| Starting liquor | 10.35 | 0.019 | 0.0010 | 0.00966 |
| 5 | 10.02 | 0.0049 | 0.00013 | 0.00130 |
| 4 | 10.02 | 0.0048 | 0.00012 | 0.00120 |
| 3 | 10.02 | 0.0053 | 0.00014 | 0.00140 |
| 2 | 10.09 | 0.0068 | 0.00009 | 0.00089 |
| 1 | 9.93 | 0.0082 | 0.00013 | 0.00131 |

Sample refluxed at atmospheric boiling (about 118° C.) for 1 hour and each sample charged with $(HN_4)_2S_2O_8$ at a rate of 20 pounds/ton $Al_2O_3$, only the seed concentration varies. Maximum removal of chromium was achieved with an addition of 2 percent of iron oxide seed (based on aluminum nitrate solution).

The effect of using iron oxide seed alone or ammonium persulfate alone on chromium removal, as compared with the result obtained by using the two reagents together in accordance with the present invention is not significant. The aluminum nitrate solution treated had the composition given in example 2 in the series numbered I, and the composition of example 3 in the series numbered II. The results are shown in table 3:

TABLE 3

[Effect of iron oxide seed and ammonium persulfate as compared to a sample treated with iron oxide seed only and sample treated with ammonium persulfate only]

| Sample | Additive | $Al_2O_3$ | $Cr_2O_3$ | $Fe_2O_3$ |
|---|---|---|---|---|
| I. Starting liquor | | 10.35 | 0.0018 | 0.020 |
| 1 | Iron oxide seed and $(NH_4)_2S_2O_8$ | 10.31 | 0.00022 | 0.0022 |
| 2 | Iron oxide seed only | 10.11 | 0.00093 | 0.0022 |
| 3 | $(NH_4)_2S_2O_8$ | 10.34 | 0.00088 | 0.018 |
| II. Starting liquor | | 11.28 | 0.00105 | 0.0141 |
| 1 | Iron oxide seed and $(NH_4)_2S_2O_8$ | 10.31 | 0.00022 | 0.0022 |

Note: The above samples were digested at about 118° C. under reflux for 1 hour in a 300 ml. Erlenmeyer flask on a Mag-mixer hot plate while agitating with a 1 inch Teflon-coated stirrer. Two starting liquors (I, II) were used of different $Cr_2O_3$ concentrations to show the effect of 5 percent iron oxide seed (by weight) plus a 10 pounds/ton $Al_2O_3$ charge of $(NH_4)_2S_2O_8$ (I-1., II-1.) as compared to a sample charged with 5 percent iron oxide seed (by weight) only (I-2.) and as compared to a sample charged with $(NH_4)_2S_2O_8$ at a rate of 10 pounds/ton $Al_2O_3$ only (I-3.).

The far greater effectiveness of the iron oxide seed-ammonium persulfate combination is clearly apparent. Aluminum nitrate solution purified with this combination treatment can be evaporated and the crystallized nonahydrate can be thermally decomposed to yield a high grade of pure alumina.

EXAMPLE 5

Preparation of Thermal Decomposition Iron Oxide Seed

To obtain seed having the proper characteristics, ferric nitrate nonahydrate is melted and evaporated at boiling temperature until about 35 percent by weight remains at which time the temperature will have reached about 135° C. The slurry, which consists of $Fe_2O_3$ in a melt of "basic" iron nitrate, is then fired at 350° C. for 10 to 30 minutes to yield ferric oxide solid containing about 2 percent to 10 percent L.O.I. (mainly $H_2O$ and $HNO_3$). This solid is red to black in color, nonmagnetic, granular; and hematitic, having a particle size averaging 0.05 to 2 microns, some particles up to 40 microns. The surface area depends upon the firing time, and ranges from about 20 to 80 square meters per gram.

What is claimed is:

1. Process for the removal of chromium from a chromium-contaminated aqueous solution of aluminum nitrate containing hematitic iron oxide solids, comprising adding to said solution an alkali persulfate, and heating the solution at a temperature between about 105° C. and about 120° C. for a period of time between about 30 minutes and about 5 hours, to provide a purified aluminum nitrate solution containing not more than 0.0004 percent $Cr_2O_3$ by weight (alumina basis).

2. The process of claim 1 in which said iron oxide is present in a proportion of about 1 to 5 parts per 100 parts of solution.

3. The process of claim 1 in which said alkali persulfate is ammonium persulfate.

4. The process of claim 1 in which said persulfate is added in an amount between about 2.5 and about 10 percent by weight of the alumina ($Al_2O_3$) present in the solution.

5. The process of claim 1 in which the aluminum nitrate solution is derived from the nitric acid extraction of an aluminous ore.

* * * * *